United States Patent [19]

Schiesser

[11] Patent Number: 4,712,989
[45] Date of Patent: Dec. 15, 1987

[54] EXTRUSION MEANS FOR PRODUCING RUBBER PROFILES

[76] Inventor: Walter A. Schiesser, Giebeleichstrasse 70, 8152 Glattbrugg, Switzerland

[21] Appl. No.: 940,226

[22] Filed: Dec. 8, 1986

Related U.S. Application Data

[63] Continuation of Ser. No. 682,933, Dec. 18, 1984, abandoned.

[30] Foreign Application Priority Data

Dec. 23, 1983 [CH] Switzerland .................. 6922/83

[51] Int. Cl.[4] .............................. B29C 47/02
[52] U.S. Cl. .................... 425/114; 156/244.11; 264/174; 264/177.1; 264/177.16; 425/461
[58] Field of Search .............. 264/174, 177.1, 167, 264/177.16; 425/113, 461, 114; 156/244.11, 244.12

[56] References Cited

U.S. PATENT DOCUMENTS

| | | | |
|---|---|---|---|
| 2,683,897 | 7/1954 | Patterson | 425/465 |
| 3,387,330 | 6/1968 | Lemelson | 264/167 |
| 3,409,930 | 11/1968 | Linker | 15/250.06 |
| 3,428,997 | 2/1969 | Rickett | 15/250.41 |
| 3,541,629 | 11/1970 | Quinlan et al. | 15/250.42 |
| 3,744,947 | 7/1973 | Skobel | 264/174 |

Primary Examiner—Jay H. Woo
Assistant Examiner—Timothy W. Heitbrink
Attorney, Agent, or Firm—Ostrolenk, Faber, Gerb & Soffen

[57] ABSTRACT

Extruded rubber profiles are often prone to a warping and a distortion during their production. In order to achieve in windshield wiper blades rubber profiles a corresponding stiffening and at the same time a simple means of mounting a spring elastic supporting strip is embedded into the heel of the rubber profile by means of injecting rubber mass partly around the supporting strip. The corresponding shaping of an extrusion head including an extrusion die allows a leaving of rubberless areas extending along the two longitudinal edges of the supporting strip.

13 Claims, 6 Drawing Figures

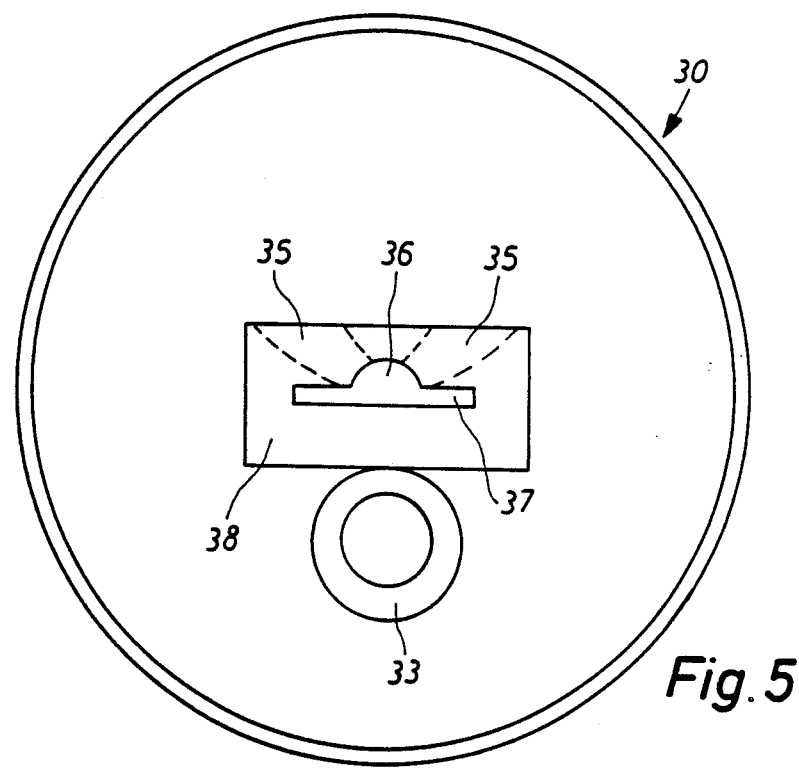
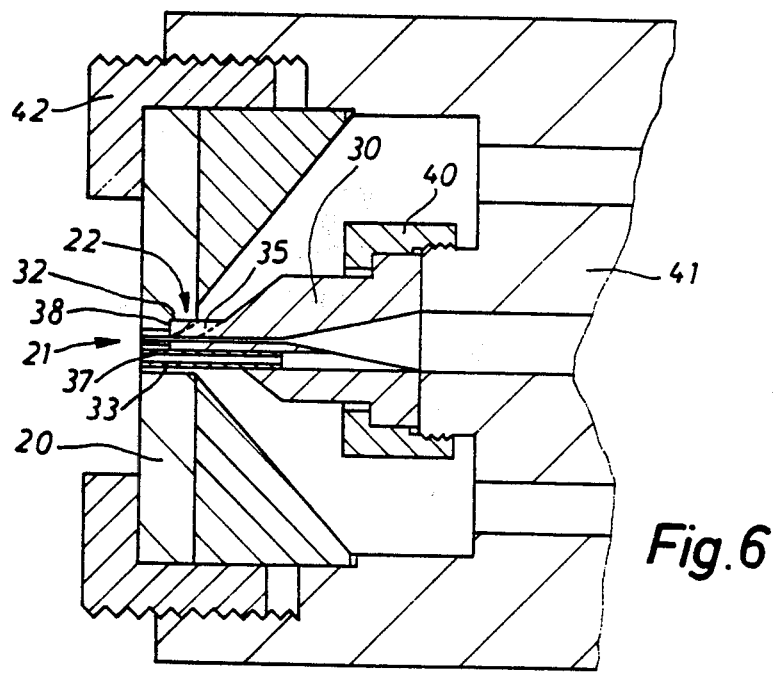

EXTRUSION MEANS FOR PRODUCING RUBBER PROFILES

This is a continuation application of Ser. No. 682,933, filed Dec. 18, 1984, now abandoned.

BACKGROUND OF THE INVENTION

1. Field of the Invention

The present invention relates to a method of producing rubber profiles for windshield wiper blades including a spring elastic supporting strip. The invention relates also to an extrusion head for the production of rubber profiles for windshield wiper blades including a spring elastic supporting strip embedded partly in the heel section of the rubber profile and having rubberfree edge sections extending in its longitudinal extent.

2. Description of the Prior Art

A conventional method of producing windshield wiper blades is an assembling of the supporting strip and the produced rubber profile during a separate tedious manufacturing step.

Furthermore, the rubber lip of the rubber profile which in operation contacts the windshield being wiped must meet high demands: small irregularities of the edges of the lips produce streaks on the windshield. Accordingly, the production of such rubber profiles is a rather intrinsic matter.

In generally known pressing processes such as transfer pressing methods or compression pressing methods the windshield wiper strip profiles are produced in form of double-profiles. Such precursors will be severed longitudinally by means of a punch cutting or by circular knives.

Such severing method produces the edges of the lip of the wiper blade which contact the windshield. Because the cutting is carried out at the product which already has been vulcanized and accordingly has already extremely viscous properties the cutting knives are subjected to a considerable wear. Furthermore, foreign bodies present within the rubber may prevent a clean cut. Due to this reason a separate production step encompassing a cleaning of the rubber mixture is often unvoidable.

Other known methods encompass extrusion processes. In general such processes do not necessitate cutting steps in order to carry out a severing extending in the longitudinal extent of the strips being produced. However, quite often the extruded rubber profile incorporates distortions and accordingly a cutting step for the production of rectilinearly extending edges of the lips is mandatory.

SUMMARY OF THE INVENTION

Accordingly, it is an object of the invention to provide a method of producing rubber profiles for windshield wiper blades by means of an extruding process in which the extruded wiper blades are free of distortion and have smooth lips.

A further object is to provide a method of producing rubber profiles for windshield wiper blades including a spring elastic supporting strip in which the rubber profile is produced continuously by extrusion of a rubber mass and the supporting strip is placed simultaneously into the heel section of the rubber profile by means of injecting rubber mass partly around the supporting strip leaving rubberless sections on the supporting strip extending in longitudinal direction thereof.

Yet a further object is to provide an extrusion head for the production of rubber profiles for windshield wiper blades including a spring elastic supporting strip embedded partly in the heel section of the rubber profile and having rupper-free edge sections extending in its longitudinal extent in which the extrusion head comprises an extrusion die including an extrusion opening having a cross-sectional shape corresponding to the profile cross-section to be extruded, a an extrusion pin for feeding the supporting strip, which pin is located behind the extrusion die and is provided with a front end section received in the rear section of the extrusion opening, which is provided further with a passage corresponding to the supporting strip to be fed and having its front end adjoining directly the corresponding passages of the extrusion die and is provided further with recesses located at its outer surface intended for feeding and guiding of plastified rubber mass onto the center areas of the supporting strip.

The rubber-free longitudinal edge sections of the supporting strip can be engaged by the mounting means for the windshield wiper blade of the windshield wiper arm whereby the engagement is a sliding engagement; accordingly the windshield wiper blade can adjust itself to the curvature of the windshield.

Due to a direct embedding of the spring elastic supporting strip into the rubber profile a large enough stiffening of the freshly extruded article is achieved; a warping and distortion thereof is positively prevented. Also intrinsic cutting procedures producing waste material are no longer necessary.

By means of the extrusion head and the extrusion die a production is positively attainable in which certain predetermined areas of the supporting strip are not covered by or embedded in rubber material.

According to a preferred embodiment the extrusion head comprises at the tip of its pin an auxiliary pin which produces in operation a cavity within the rubber profile and which auxiliary pin projects into the extrusion opening of the extrusion die.

This allows now the supporting effect of the supporting strip to be transmitted onto the lips of the wiper blade whilst achieving little expense on material for the production of such a profile. This allows now a doing away of a cutting step necessary for correcting lips of the blades which would otherwise be deformed by a warping and distorsion.

BRIEF DESCRIPTION OF THE DRAWINGS

The present invention will be more fully understood by reference to the following detailed description thereof, when read in conjunction with the attached drawings, and wherein

FIG. 5 a view of the face surface of the extrusion head; and

FIG. 6 a view of a section through an extrusion die and extrusion head in their assembled operative state.

DETAILED DESCRIPTION OF THE PREFERED EMBODIMENT

Figure 1:
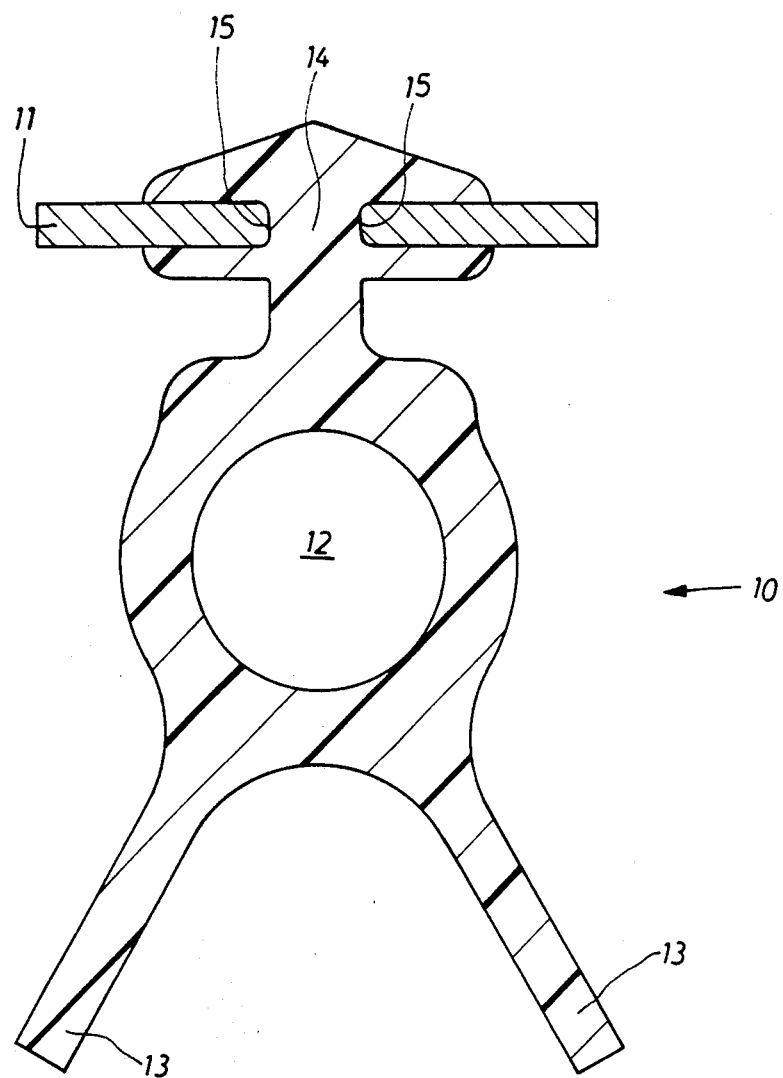
FIG. 1 is a view of a cross section of a windshield wiper blade produced in accordance with the present invention.

FIG. 1 of the drawings illustrate a section through a wiper blade 10 constructed in accordance with the present invention and having a spring elastic supporting strip 11 embedded therein, a cavity 12, wiper lips 13 and a profile heel section 14. Such as can be seen clearly from the figure the spring elastic supporting strip 11 comprises openings including edge sections 15 by means of which the interconnection between the profile heel section 14 and the spring elastic supporting strip 11 is achieved.

Figure 2:
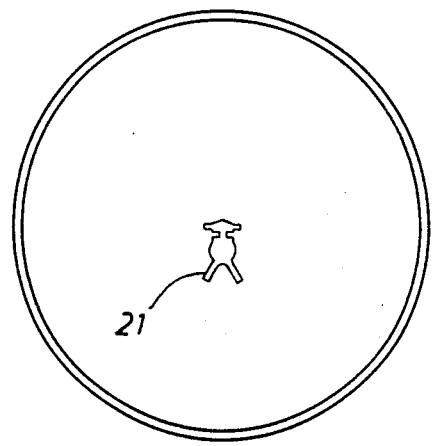
FIG. 2 is a view of the surface of an extrusion die located oppositely of the extrusion head.

FIG. 2 illustrates the extrusion die 20 viewed from the exit side of the rubber profile. The extrusion opening which corresponds regarding the cross section to the complete profile is identified by the reference numeral 21.

Figure 3:
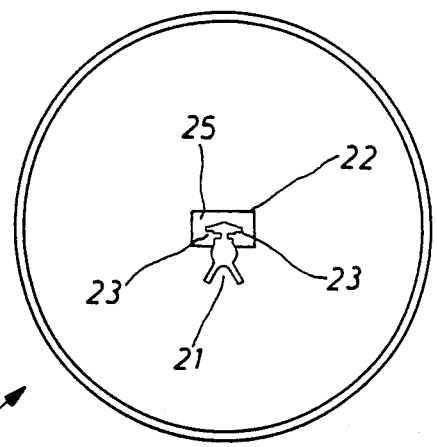
FIG. 3 a view of the surface of the extrusion die facing the extrusion head.

FIG. 3 illustrates the extrusion die 20 when viewed from the surface facing the extrusion head. Specifically illustrated are the extrusion opening 21 and a recess 22 including its bottom surface 25 which recess 22 is intended for receipt of the front part of the extruding head. The supporting strip 11 is guided along its longitudinal edges through the sections 23 of the extrusion opening 21, which sections 23 surround the areas of the longitudinal edges of the supporting strip 11 such that no plastified rubber material can flow thereupon.

Figure 4:
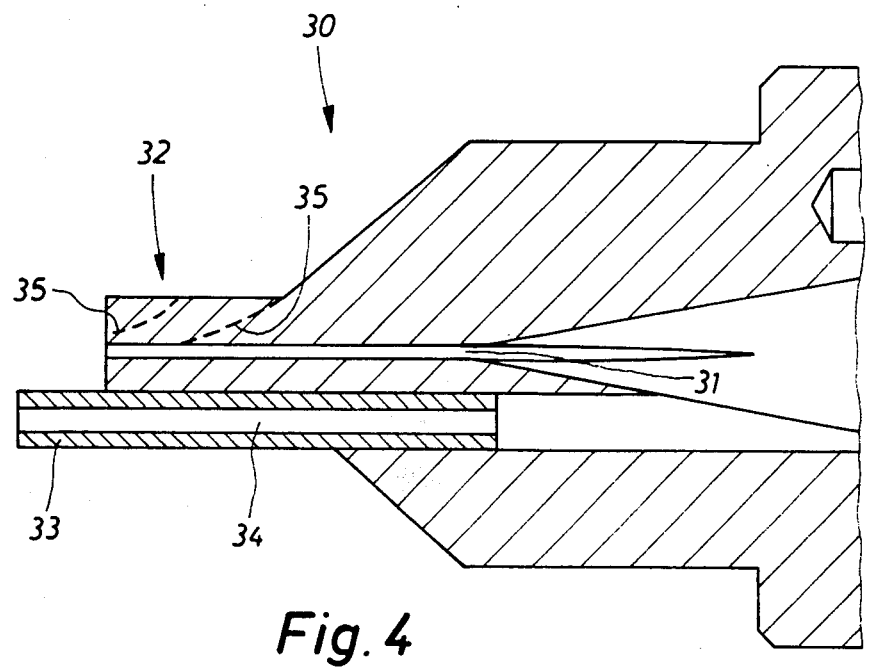
FIG. 4 a view of a section through the extrusion head.

FIG. 4 illustrates a view of a section through the extrusion die 20 operating together with the extrusion head 30. Latter is provided with a passage 31 for the supporting strip 11, an extrusion pin 32 engaging into the recess 22 of the extrusion die 20 and furthermore an auxiliary pin 33 which in operation forms a longitudinally extending cavity 12 in the wiper blade profile 10. The auxiliary pin 33 is provided with a passage 34 allowing the feeding of air into the cavity 12 of the profile 10 during the extrusion process. Channels 35 for feeding plastified rubber mass extend laterally within the pin 32 and are indicated by broken lines.

FIG. 5 illustrates a front view of the extrusion head. The figure shows the face surface 38 of the pin 32 including the common port 36 of the feed channels 35; lateral feed channels are again indicated by broken lines. Further illustrated are the opening 37 of the passage 31 for the supporting strip 11 as well as the auxiliary pin 33 including its passage 34.

FIG. 6 illustrates a view of a section through the extrusion die 20 and the extrusion head 30 in their assembled operational condition. The extrusion head 30 is mounted to a frame member 41 of the extruder press by means of a cap screw 40. A further cap screw 42 secures the pin 32 engaging such into the corresponding recess 22 of the extrusion die 20 that the face surface 38 cooperates sealing with regard to the plastified rubber mass with the bottom surface of the recess 22. This assures additionally that no rubber mass may reach the areas which must remain blank and exposed extending along the corresponding upper longitudinal edges of the supporting strip 11. The rubber mass which must be applied onto the lower sides of the supporting strip 11 which must be covered therewith is led thereto in that it flows around the auxiliary pin 33.

While there are shown and described present preferred embodiments of the invention, it is to be distinctly understood that the invention is not limited thereto, but may be otherwise variously embodied and practiced within the scope of the following claims.

I claim:

1. Extrusion means for producing rubber profiles from extruded rubber mass, said profiles having a heel section, said heel sections having a spring elastic supporting strip partly embedded therein to form rubber free edge sections projecting out of the edges of the profiles, the extrusion means comprising:
an extrusion die having an outer, downstream side, which is downstream in relation to the movement of the extruded rubber mass through the die, the die having an inner, upstream side which is upstream in relation to the movement of the extruded rubber mass through the die; an extrusion opening through the die, which opens at the downstream side of the die in a cross-sectional shape corresponding to the cross-section of the profiles to be extruded; a recess defined in the upstream side of the die, and communicating into the extrusion opening and having a first cross section across the extrusion opening;
an extrusion head disposed upstream of the die for supplying rubber mass through the extrusion die, the extrusion head comprising an extrusion pin projecting downstream toward the die and having a downstream end portion which projects into the recess in the die, the downstream end portion of the extrusion having a cross sectional shape that corresponds to the first cross section of the recess in the die, and the extrusion pin being sealingly located in the recess in the die;
the extrusion pin further including and defining a first passage through the extrusion pin for supplying to the extrusion die rubber mass received from the extrusion head; the extrusion pin including a second passage therethrough which is of a shape for passing along the supporting strip of the profiles.

2. The extrusion head of claim 1, wherein said first passage opens inside the recess to deliver rubber mass to the supporting strip as the strip moves through the die, and the first passage is shaped so as to deposit rubber mass on the strip and thereby moves the strip through the extrusion head and through the die as the rubber mass is fed.

3. The extrusion head of claim 2, wherein the first passage is angled to deliver rubber mass toward the top of the strip located in the second passage.

4. The extrusion head of claim 3, further comprising a bearing surface located in the second passage beneath the strip for supporting the strip from the bottom of the strip as the strip is moved through the extrusion pin by rubber mass delivered to the top of the strip from the first passage.

5. The extrusion head of claim 3, wherein the first passage is inclined at an acute angle to the strip.

6. The extrusion head of claim 3, further comprising a third passage in the extrusion head for rubber mass, the third passage being located outside the extrusion pin and extending into and continuing in the die, whereby rubber mass enters the die from the first and the third passages.

7. The extrusion head of claim 6, wherein the extrusion pin and the second passage are shaped to prevent the strip while in the second passage from contact with rubber mass from the third passage, and downstream past the extrusion pin inside the die, the third passage communicating with the strip inside the die.

8. The extrusion head of claim 7, further comprising a bearing surface located in the second passage beneath the strip for supporting the strip from the bottom of the strip as the strip is moved through the extrusion pin by rubber mass delivered to the top of the strip from the first passage.

9. The extrusion head of claim 8, further comprising an auxiliary pin extending from the extrusion head and also downstream from the extrusion pin, and the auxiliary pin being located with respect to the first and third passages such that those passages deliver rubber mass around the auxiliary pin, and the auxiliary pin being shaped and positioned for forming a longitudinally extending cavity through the rubber profiles being extruded.

10. The extrusion head of claim 9, wherein the extrusion opening through the die is shaped for producing a windshield wiper blade shape, which includes a heel section, and the extrusion opening being further shaped at the heel section to embed at the heel section the spring elastic supporting strip which is passing through the extrusion opening along with the rubber mass forming the profiles.

11. The extrusion head of claim 10, wherein the transverse cross section of the extrusion pin is shaped differently than the cross section of the extrusion opening in the die such that the extrusion pin does not cover the cross section of the die to which the third passage communicates.

12. The extrusion head of claim 1, further comprising an auxiliary pin extending from the extrusion head and also downstream from the extrusion pin, the auxiliary pin being located with respect to the first passage such that the first passage delivers rubber mass around the auxiliary pin, and the auxiliary pin being shaped and positioned for forming a longitudinally extending cavity through the rubber profiles being extruded.

13. The extrusion head of claim 1, wherein the extrusion opening through the die is shaped for producing a windshield wiper blade shape, which includes a heel section, and the extrusion opening being further shaped at the heel section to embed at the heel section the spring elastic supporting strip which is passing through the extrusion opening along with the rubber mass forming the profiles.

* * * * *